April 19, 1955 P. E. VOLZ 2,706,785

LOW-FREQUENCY STANDARD GENERATOR

Filed May 21, 1951 2 Sheets-Sheet 1

INVENTOR
Philip E. Volz
BY
Charles H. Brown
ATTORNEY

INVENTOR
Philip E. Volz
BY
Charles H. Brown
ATTORNEY

United States Patent Office 2,706,785

Patented Apr. 19, 1955

2,706,785

LOW-FREQUENCY STANDARD GENERATOR

Philip Eckert Volz, Florham Park, N. J., assignor to Radio Corporation of America, a corporation of Delaware Application May 21, 1951, Serial No. 227,305

10 Claims. (Cl. 250—36)

The invention relates to low-frequency oscillator generators and it particularly pertains to a circuit arrangement for stabilizing the frequency of oscillations generated by a mechanical element.

Heretofore, prior art arrangements have incorporated tuning forks operating in circuits which obtain a sine wave from a pickup coil and apply that wave after modification to a driving coil associated with the fork. This required class A operation of all circuits between the pickup and driving coils of the tuning fork. Changing characteristics in the circuits are likely to alter the gain and operation of the circuit. As a result, the energy supplied to the driving coils will vary to some extent and the amplitude of the oscillations derived from the tuning fork arrangement will also vary accordingly. In addition, the frequency of the oscillations produced by the tuning fork are likely to be seriously affected insofar as the tolerances of the utilization circuits are concerned.

As a means of overcoming these disadvantages, various limiting and driving circuits have been developed. For example, U. S. Patent 2,451,245 issued October 12, 1948, to E. R. Shenk and A. Kahn describes one such arrangement. While this last arrangement is accurate to several parts in 100,000 and has proven satisfactory in many applications, there are other applications which require more accurate control of the frequency.

An object of the invention is to obtain low frequency oscillations of substantially constant amplitude and constant frequency from a circuit employing a vibrating element within a degree of accuracy of the order of 1 to 5 parts in a million.

Another object of the invention is to provide an improved low-frequency generator of a high degree of accuracy and which is substantially unaffected by changes in circuit component values.

A further object of the invention is to provide a frequency generator of very high accuracy which can be used as a standard and which is substantially insensitive to fluctuations in the standard power supply system on which it is operated.

The invention will be described in greater detail with reference to the accompanying drawing forming a part of the specification and in which.

Figures 1, 2:
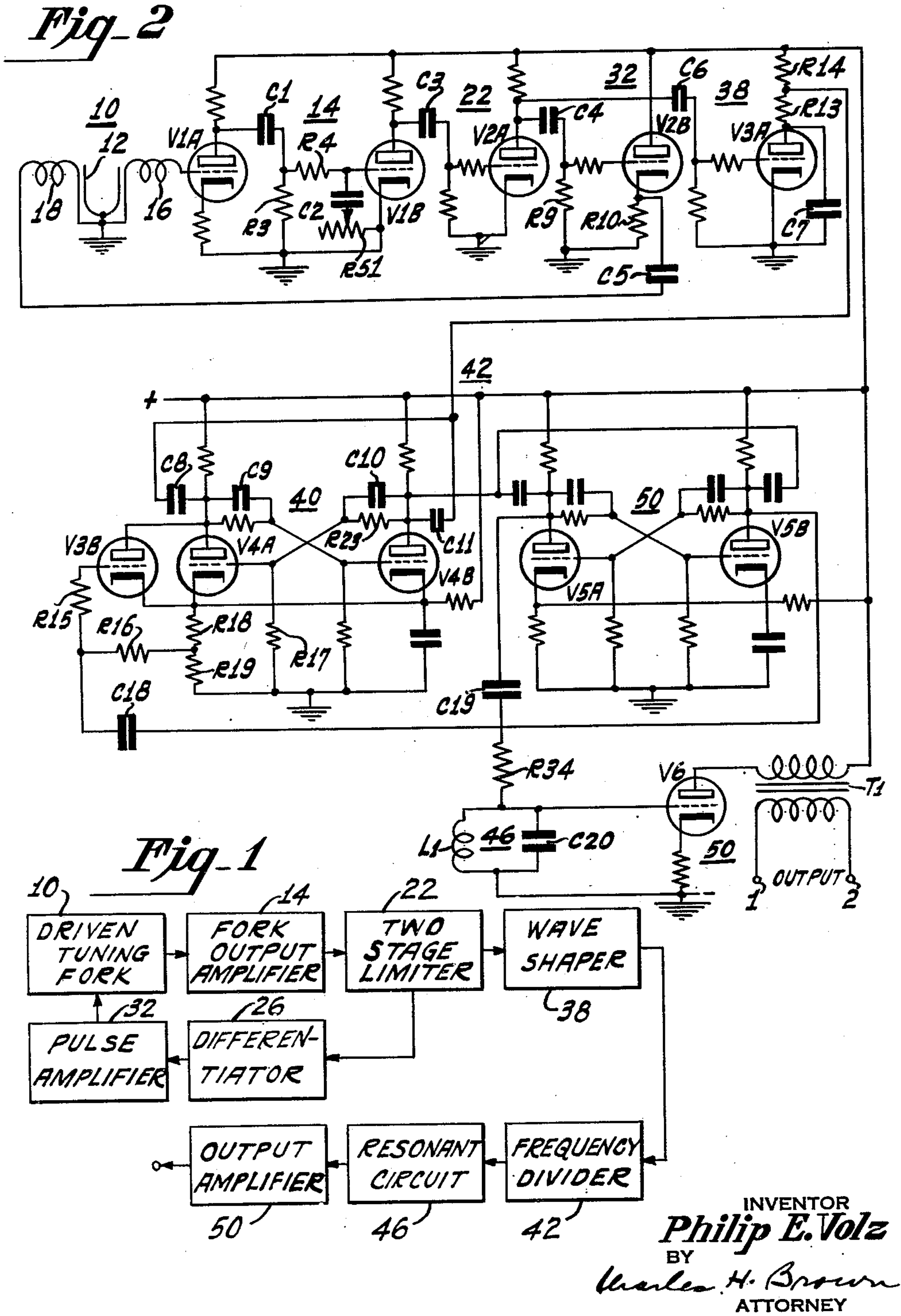
Fig. 1 is a functional diagram of a low-frequency generator according to the invention.
Fig. 2 is a schematic diagram of the generator shown in Fig. 1.

Referring to Fig. 1, there is shown an arrangement having an electrically driven tuning fork stage 10, the electrical output of which is applied to a tuning fork output amplifier 14. The output of fork amplifier 14 is applied to a two-stage limiter 22 from which an output is obtained and differentiated in differentiator 26 and the differentiated output applied to driven tuning fork stage 10 after amplification in a pulse amplifier 32. This results in a circuit having extremely stable characteristics. Such a low-frequency standard generator as described is useful in many applications requiring a standard source of low-frequency oscillations. One such example is an arrangement for synchronizing the operation of a telegraph receiving circuit with the transmitting circuit. A standard frequency wave generated by the arrangement just described is shaped in a wave shaper 38 and stepped down in frequency by means of a frequency divider 42. The stepped-down frequency wave is then shaped up in a resonant circuit 46 and applied to an output amplifier 50 in order to provide the standard frequency wave at the amplitude required by the utilization circuit.

Referring to Fig. 2, there is shown in schematic form a tuning fork 12, a pickup coil 16 and a driving coil 18. The vibration frequency of the tuning fork may be whatever is desired. However, certain frequencies are much more easily attainable in practice, due to inherent limitations of material and the like. Preferably, a tuning fork of about 1800 C. P. S. is employed and the frequency multiplied or divided as required by the problem at hand. One terminal of each of coils 16 and 18 is grounded and preferably the tuning fork 12 itself is grounded. Pickup coil 16 is connected to the grid of a vacuum tube V1A which is operated as a class A amplifier.

The amplified and inverted fork voltage appears at the anode of tube V1A and is applied by way of a capacitor C1 to the grid circuit of a tube V1B. A grid leak resistor R3 and a series grid resistor R4 are included in this grid circuit. A phase shifter network comprising a capacitor C2 and a variable resistor R51 is connected between the grid and the cathode of tube V1B. The operation of this network will be explained later. The junction point of resistors R3 and R4 will vary from positive and negative with respect to ground. When the junction point is negative, the grid of tube V1B is also negative and may be below the cut-off value at the peak of the swing. When the junction point is positive, the resulting grid current clamps the grid at cathode potential. The input wave is clipped on both sides by this circuit; the positive side due to grid clamping and the negative side due to grid cut-off. The anode voltage of tube V1B is squared up considerably. This voltage is coupled by a capacitor C3 to the grid circuit of a tube V2A. Tube V2A operates to clip both sides of the input voltage as explained above. The anode voltage of tube V2A is more nearly square than that at the anode of tube V1B, due to the second clipping action. The anode of tube V2A is coupled by a capacitor C4 to the grid of a tube V2B. The square wave is differentiated in a network comprising a capacitor C4 and a resistor R9 so that the voltage at the grid of tube V2B is in the form of a train of pulses. Each positive transition at the anode of tube V2A results in a positive pulse at the grid of tube V2B, while negative transitions result in negative pulses. Tube V2B is a cathode follower, normally conducting only a small anode current, since the D.-C. grid return through resistor R9 is connected to the bottom of cathode resistor R10. When a positive pulse is applied to the grid of tube V2B, the cathode potential will follow it in the normal manner, but when a negative pulse is applied, the cathode can only drop from the normal small positive voltage to zero. The cathode voltage therefore consists of positive pulses of nearly the same amplitude as the positive grid pulses, and negative pulses which are small compared to the negative grid pulses. For all practical purposes, only positive voltage pulses appear at the cathode of tube V2B. These pulses are coupled to the fork drive coil 18 by a capacitor C5. By eliminating the negative pulses, the energy applied to coil 18 is maintained at a substantially constant level because capacitor C5 is then permitted to charge fully each cycle and deliver the stored energy at the same amplitude level. The circuit connections described above provide this advantageous operation without requiring any additional circuitry. The resulting current through drive coil 18 creates a magnetic field and imparts a driving force to tuning fork 12 which is made of magnetic material.

By the use of the circuit connections described above, a wide variation in component values is permissible without adversely affecting the frequency of operation. A reduction in the value of capacitor C5 which is preferably 0.1 mfd. to one-half the original value will result in a maximum change of +1.8 parts per million while an increase of ten times the original value will result in only −1.9 parts per million change. A five percent change in the value of resistor R10 which is preferably 62 kilohms will result in a maximum change of but +0.8 or −2.5 parts per million. A ten percent change in filament voltage will result in less than 0.8 part per million change and the same degree of variation in anode voltage will result in less than 2.5 parts per million change maximum. A reduction of the mutual conductance factor of tubes V1A, V1B, V2A and V2B to roughly 10 percent of the original value will result in a change of only 3.3 parts per million. And a fifty percent variation of less critical component values, for example, capacitors C4 and resistors R8 and R9 will result in less than 9.0 parts per million change in frequency.

Figure 3:
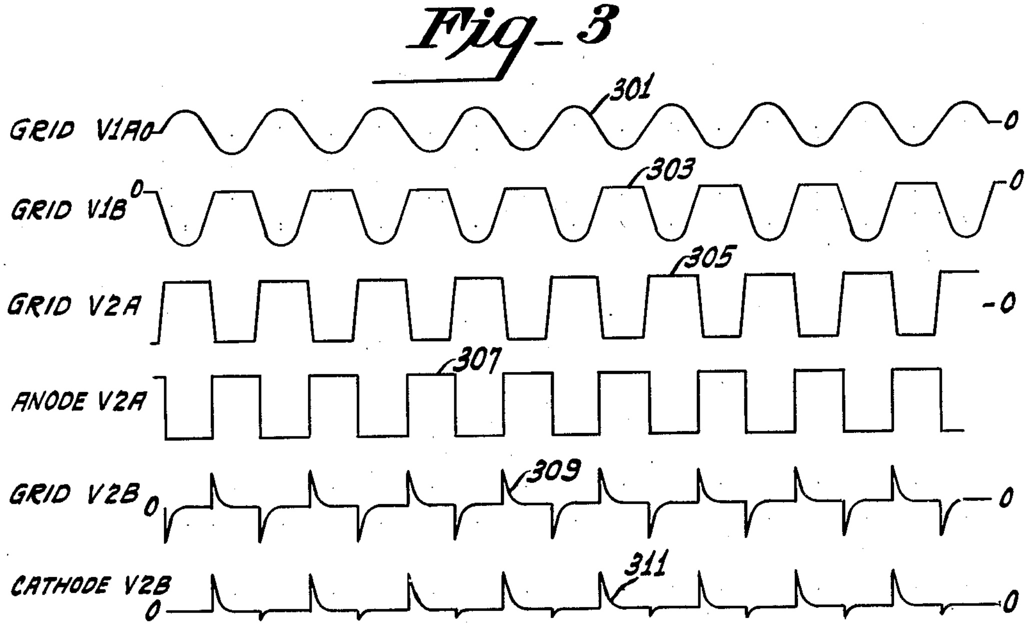
Figure 3 is a chart of waveforms appearing at designated points in the oscillation generating portion of the circuit of Figure 2.

If the phase conditions are correct around the loop formed by the amplifier and fork as described, the system will be regenerative and any slight disturbance after the system is initially turned on will be amplified and cause further build-up of circulating energy. The amplitude of oscillation is limited by the following. As the fork vibration amplitude increases, the output voltage to tube V1A increases. Tubes V1B and V2A are operated as a two-stage limiter, and after a certain fork output voltage is reached, a further increase in fork output will produce practically no increase in the peak-to-peak voltage output of tube V2A. With the limiters operating as above, the output pulses from tube V2B are of a fixed amplitude and fork 10 is driven at a fixed amplitude of vibration. As shown above, the fork amplitude is stabilized due to the action of the limiters. The fork operates in the manner of a high Q resonant circuit. It is well known that the exact frequency of an oscillator depends on the tank circuits constants and the phase shift in the feedback loop. Therefore, in order to control the frequency of oscillation, the phase shifter network included in the grid circuit of tube V1B changes the phase shift around the loop by adjustment of the variable resistor R51, and shifts the operating frequency. The waveforms appearing in this portion of the circuit are shown in Fig. 3. The output of coil 16 is represented by curve 301. Squaring of one side of the fork output wave at the anode of tube V1A is shown by curve 303 and squaring of the other side at the anode of tube V1B is illustrated by curve 305. The action of limiter 22 is represented by curve 307. Curve 309 shows the results of the differentiating process and curve 311 shows the elimination of negative pulses brought about by the cathode connections of tube V2B.

An example of a practical application of the stable low frequency generator is found in the generation of a local timing wave for a multiplex telegraph signalling system. Such systems conventionally require a standard wave of the order of 600 C. P. S. The frequency of the better tuning forks available for the generator described is of the order of three times the required standard frequency. The reason for this is simply the fact that manufacturers of tuning forks can produce tuning forks of highest stability only within a rather restricted range of frequencies. The fork frequency must be divided by three to obtain the desired standard frequency. This is accomplished with binary dividers having a reset circuit incorporated therein. The square wave of fork frequency at the anode of tube V2A is coupled by a capacitor C6 to the grid circuit of tube V3A, operated as an additional clipper stage and wave shaper stage. A capacitor C7 is connected between the anode and cathode of tube V3A and this capacitor charges through load resistors R13 and R14. Capacitor C7 is discharged through the much lower plate resistance of tube V3A when the latter is conducting. Therefore, the negative transitions at the anode of tube V3A are much steeper than the positive transitions.

A binary circuit 40 comprising tubes V4A and V4B is coupled to the junction of resistors R13 and R14. This is a flip-flop or bistable multivibrator circuit with the addition of feedback capacitors C9 and C10. When tube V4A is conducting, tube V4B is blocked due to the feedback path constituted by resistors R22 and R20. The grid of tube V4A is clamped to the cathode due to the feedback path resistors R23 and R17. If a negative pulse is applied to both anodes through the drive capacitors C8 and C11, the grid of tube V4B will be driven still more negative by an amount somewhat less than the pulse amplitude. The anode voltage of tube V4B would remain unchanged since this tube is already blocked. The grid of tube V4A is driven negative by the negative pulse and results in an amplified positive pulse appearing at the anode of tube V4A. This positive pulse is much larger than the negative pulse applied through capacitor C8 and hence a net positive pulse is applied to the grid of tube V4B. This causes tube V4B to conduct and the regenerative nature of the circuit causes it to complete the switching to the other stable state where tube V4B is conducting and tube V4A is blocked.

If the drive pulse had been positive instead of negative in the above description, the circuit would not have switched. In this case, the grid of tube V4A is already clamped to the cathode and hence the positive drive pulse raises the common cathode voltage. The grid of tube V4B is driven in the positive direction by the pulse, but since the cathode has also been driven in the same direction, this tube is still blocked. Therefore, on this positive drive pulse, the circuit will not switch. Of course if the positive drive pulses were made large enough in amplitude, they would cause the circuit to switch. However, with the proper drive pulse amplitude, the binary circuit 40 will only switch on negative input pulses, and not on positive input pulses. Therefore, the output frequency of binary circuit 40 would normally be one-half the drive frequency obtained from tube V3A.

Figure 4:
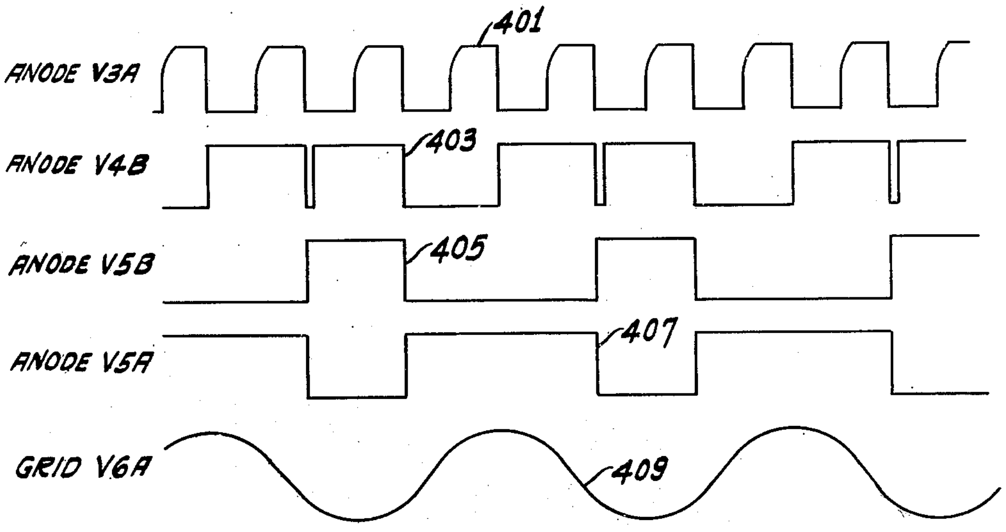
Figure 4 is a chart of voltage waveforms appearing in the frequency divider portion of the circuit of Figure 2.

A second binary 50 comprising tubes V5A and V5B operates in the manner previously described. Binary 50 is driven from the output of the binary circuit 40, and hence the entire system of the two binary circuits would normally divide by four. A feedback path is included to alter this divisor. This path is arranged between the anode of tube V5B by way of a capacitor C18 and the grid of tube V3B. The anode of the tube V3B is connected to the anode of tube V4A. Tube V3B is normally blocked due to bias applied over resistor R15 and R16 from the junction of resistors R18 and R19. When a positive transition occurs at the anode of tube V5B, the resulting positive pulse at the grid of tube V3B causes tube V3B to conduct for a short time, causing tube V4A to conduct. Positive transitions appear at the anode of tube V5B when tube V4B is conducting and tube V4A is blocking. Therefore, due to the feedback binary circuit 40 is made to advance one count for each output cycle of binary circuit. Consequently, three negative pulses from tube V3A, plus one count due to feedback, constitute one output cycle for binary circuit 50. In other words, the two binary circuits 40 and 50 together with the reset tube V3B divide the normal input frequency obtained from tube V3A by a factor of 3. The waveforms appearing in this portion of the circuit are shown in Fig. 4. The potential at the anode of tube V3A is represented by curve 401. The anode potential wave at tube V4B is shown by curve 403. Curves 405 and 407 illustrate the waves appearing at the anodes of tubes V5A and V5B. The grid of tube V6A has a sine wave applied thereto as shown by curve 409. The output obtained from tube V6 is of similar waveform but of increased amplitude.

The waveform at the anode of tube V5A is a square wave of ⅔ duty, that is, current is flowing during ⅔ of each cycle. The desired output for the standard frequency is a sine wave and this is obtained by coupling a resonant circuit 46 comprising an inductor L1 and a capacitor C20 to the binary circuit 50 by means of a resistor R34 and a capacitor C19. The latter merely serves to block the D.-C. anode voltage from resonant circuit 46. Resistor R34 isolates the resonant circuit 46 from binary circuit 50 and allows binary 50 to operate in a normal manner. The pulses of current through resonant circuit 46 generate a sine wave of this frequency with small distortion, the resonant circuit 46 of course being tuned to the same frequency that appears at the anode of tube V5. The sinusoidal tank voltage is amplified by tube V6 and applied to a pair of output terminals 1 and 2 by transformer T1. By using binary divider circuits instead of a synchronized multivibrator divider, the output is strictly under control of tuning fork circuit 10 since a failure in the fork circuit will result in the output at terminals 1 and 2 falling off to zero.

In an application of the described circuit arrangement requiring a stable 600 C. P. S. wave the following component part values were used:

| Component | Reference No. | Value |
|---|---|---|
| Capacitors | C1 | 0.1 mfd. |
| | C2 | 0.00047. |
| | C3 | 0.05. |
| | C4 | 0.0005. |
| | C5 | 0.1. |
| | C6 | 0.01. |
| | C7 | 0.0001. |
| | C8 | 0.0001 mfd. |
| | C9 | 0.00005 mfd. |
| | C10 | 0.00005 mfd. |
| | C11 | 0.0001 mfd. |
| | C18 | 0.00015 mfd. |
| | C19 | 0.01 mfd. |
| | C20 | 0.056 mfd. |
| Inductor | L1 | 1.25 Hy, UTC HQA12. |
| Resistors | R3 | 1 megohm. |
| | R4 | 1 megohm. |
| | R8 | 100 kilohms. |
| | R9 | 100 kilohms. |
| | R10 | 62 kilohms. |
| | R17 | 2 megohms. |
| | R18 | 12 kilohms. |
| | R19 | 10 kilohms. |
| | R23 | 1.8 megohms. |
| | R34 | 680 kilohms. |
| | R51 | 1 megohm (var.). |
| Tubes | V1A, V1B | 12Ax7. |
| | V2A, V2B | 5936. |
| | V3A, V3B | 5936. |
| | V4A, V4B | 5936. |
| | V5A, V5B | 5936. |
| | V6 | ½ 5936. |
| Tuning Fork | 12 | 1,800 C. P. S. T. F. C. 1,800 N. |

The power supply delivered approximately 150 volts regulated direct current at approximately15 milliamperes. The negative pole of the power supply was grounded and the positive pole connected as indicated by the plus (+) sign.

Other values of components and different operating voltages and currents obviously may be used to generate waves of different frequencies and amplitudes.

The invention claimed is:

1. Apparatus for stabilizing the amplitude and frequency of vibration of a tuning fork comprising an electronic circuit having an amplifier stage, first and second limiter stages, a differentiating stage and a pulse amplifier stage including a grid and a cathode circuit, said stages being concatenated in the order named, said second limiter stage having an anode circuit including an output load element, a circuit including a load device in the cathode circuit of said pulse amplifier stage and a capacitor for applying electromechanical excitation to said tuning fork, said differentiating stage applying positive and negative pulses to the grid of said pulse amplifier stage, said pulse amplifier stage substantially developing pulses of one polarity only at said load device, thereby to apply energy to said tuning fork at a substantially constant level.

2. In a low frequency oscillation generator wherein the frequency is controlled by a mechanical vibrator, a system of electron discharge devices including an amplifier stage, two limiter stages and a differentiating pulse amplifier stage connected in cascade, said pulse amplifier stage having an electron discharge device including cathode and grid electrodes and a load impedance element in circuit with said cathode electrode of said device, magnetic driving and pickup means associated with said vibrator, the input circuit of said amplifier stage being subject to control by potentials induced in said pickup means, a capacitor connected between said cathode of the pulse amplifier stage and said magnetic driving means, said pulse amplifier stage being arranged to produce positive output pulses at said load impedance element of substantially the same amplitude as those applied to said grid and substantially zero amplitude negative pulses at said load element, thereby to apply energy to said driving means at a substantially constant level.

3. Apparatus for stabilizing the amplitude and frequency of vibration of a tuning fork comprising an electronic circuit having an amplifier stage, first and second limiter stages and a differentiator and pulse amplifier stage comprising an electron discharge device having cathode, grid and anode electrodes, a resistor connecting said cathode electrode to a point of fixed reference potential, series connected resistance elements connecting the grid electrode to said point and a capacitor connecting the junction of said series connected elements to the output of said second limiter stage, said stages being concatenated in the order named, said tuning fork having electromagnetic pickup and driving means associated therewith, said pickup means being coupled to said amplifier stage, and a further capacitor, said driving means being coupled by said further capacitor to said cathode of said pulse amplifier stage for supplying electromechanical excitation to said tuning fork, said further capacitor and the constants of said pulse amplifier stage having values at which said further capacitor is fully charged on each cycle of oscillation of the tuning fork.

4. The invention as claimed in claim 3 and including a phase shifter in the coupling between said amplifier stage and said first limiter for shifting the phase of output energy derived from said amplifier stage, thereby to control the frequency of energy from said generator.

5. In a low frequency oscillation generator of the type having a mechanical vibrator for controlling the oscillation frequency, electromagnetic means for exciting said vibrator, electromagnetic vibrator output means, a concatenated chain of electron tube stages for deriving output potential from said vibrator output means, the first stage having an input circuit coupled to said vibrator output means, two succeeding stages characterized as limiter stages, and a further stage arranged to develop and modify pulses from the output of said second limiter stage, said further stage comprising a capacitor and resistor in series across the output of said second limiter stage to develop a train of positive and negative pulses, and an electron discharge device having a cathode, a control grid and an anodes, a resistive load connected in the cathode circuit of said device and a resistance element coupling the grid of said device to the junction between said capacitor and said resistor, the components of said further stage having values at which substantially only positive pulses are produced across said resistive load, and a capacitive coupling element coupling the cathode of said device to said electromagnetic exciting means.

6. An electromechanical resonant system in combination with an electron discharge device having input and output electrodes, a circuit for subjecting said input electrodes to voltages set up by said resonant system, a limiter coupled to said output electrodes, a differentiating network coupled to said limiter to produce a train of pulses alternating in polarity, a pulse modifier circuit coupled to said differentiating network and arranged to produce a train of pulses of one polarity, a capacitor, and circuit components interconnecting said capacitor and said pulse modifier circuit to fully charge said capacitor once during each cycle of the wave output from said limiter, said capacitor being discharged through a circuit including an element of said resonant system, said circuit components and said capacitor having values at which charging and discharging of the capacitor is accomplished in less than one cycle of the wave set up by said resonant system.

7. The combination according to claim 6 wherein said electromechanical resonant system is constituted as a tuning fork having electromagnetic pickup and driving coils associated therewith.

8. In a low frequency oscillation generator wherein the frequency is controlled by a mechanical vibrator having magnetic driving and pickup means associated with said vibrator, a system of electron discharge devices including an electron discharge amplifier stage subject to control by potentials induced in said pickup means, circuit connections including two amplitude limiting electron discharge devices coupled in cascade to said amplifier stage, an output circuit coupled to said cascaded limiting discharge devices to present energy to an utilization device, a differentiating circuit coupled to said cascaded limiting stages to produce a train of positive and negative going pulses, a cathode follower circuit coupled to said differentiating circuit, said cathode follower circuit being connected to follow said positive pulses and to substantially eliminate said negative pulses, and a capacitor coupling said cathode follower circuit to said magnetic driving means, whereby the accuracy of said low frequency oscillation generator is substantially increased.

9. The invention as claimed in claim 8 wherein said output circuit includes electronic means for amplifying and dividing in frequency a component of output energy derived from said second limiter stage, thereby to obtain useful output energy from said generator.

10. A low frequency oscillation generator as claimed in claim 8 wherein said mechanical vibrator is a tuning fork, and including a phase shifting circuit interposed between said amplifier stage and said cascaded amplitude limiting electron discharge devices, whereby the frequency of said generator may be controlled.

References Cited in the file of this patent

UNITED STATES PATENTS

| | | |
|---|---|---|
| 2,300,271 | Whitaker | Oct. 27, 1942 |
| 2,451,245 | Shenk et al. | Oct. 12, 1948 |
| 2,478,330 | Shonnard | Aug. 9, 1949 |